July 26, 1932.  L. R. WILLIAMSON  1,869,084
HYDRAULIC CONTROL FOR POWER TRANSMISSION MECHANISM
Filed Oct. 6, 1930  4 Sheets-Sheet 1
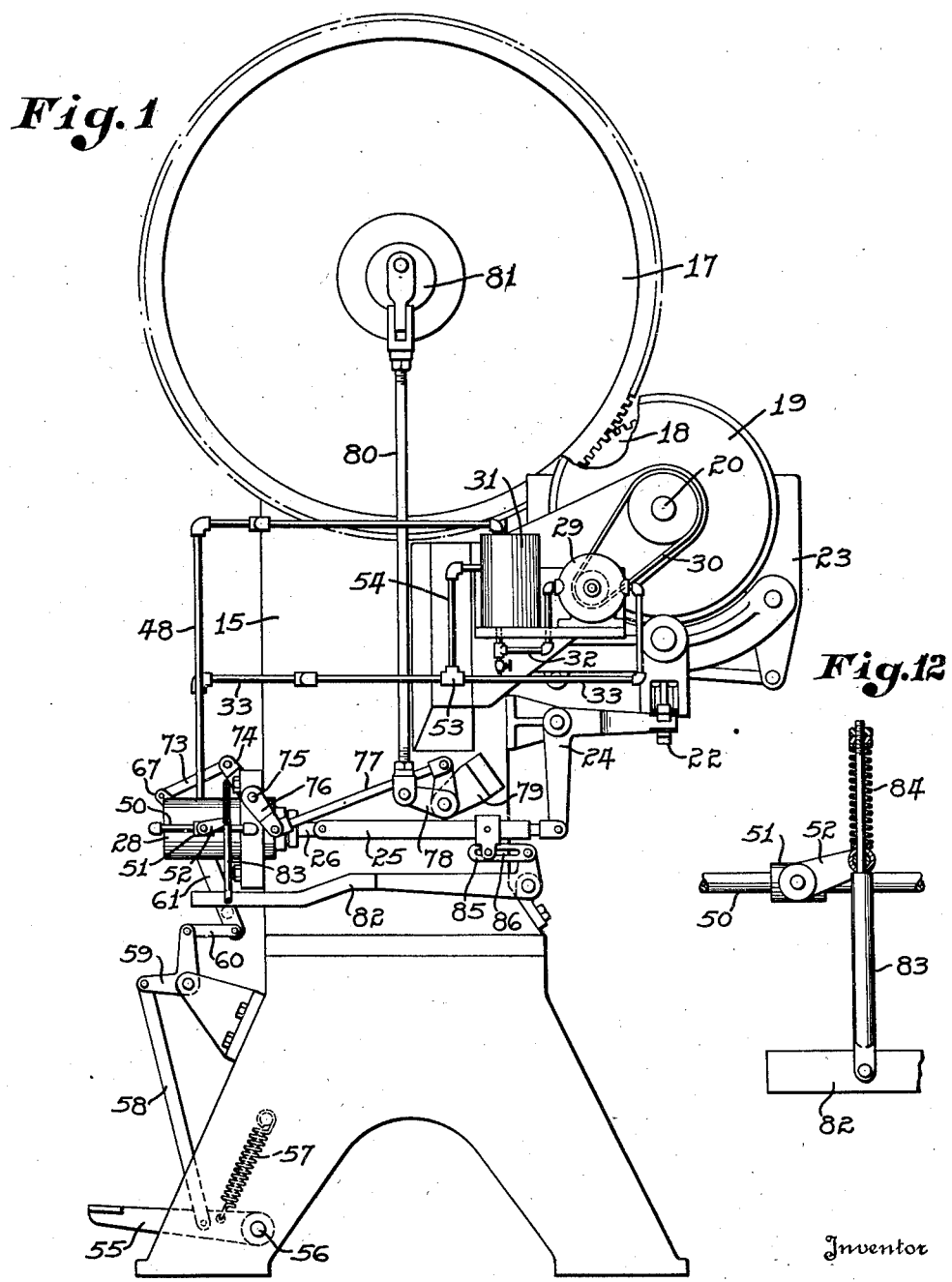
Inventor
Larkin R. Williamson
By Owen & Owen
Attorneys

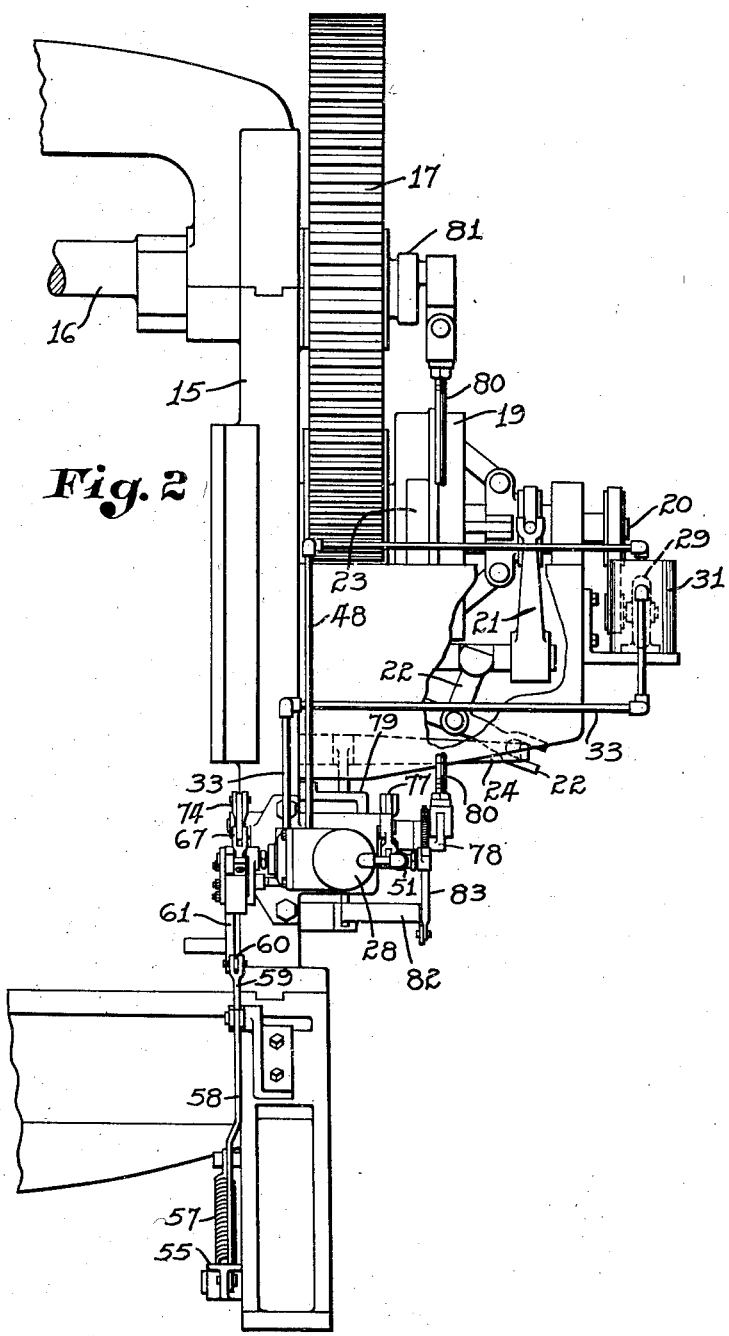

July 26, 1932.  L. R. WILLIAMSON  1,869,084
HYDRAULIC CONTROL FOR POWER TRANSMISSION MECHANISM
Filed Oct. 6, 1930    4 Sheets-Sheet 3
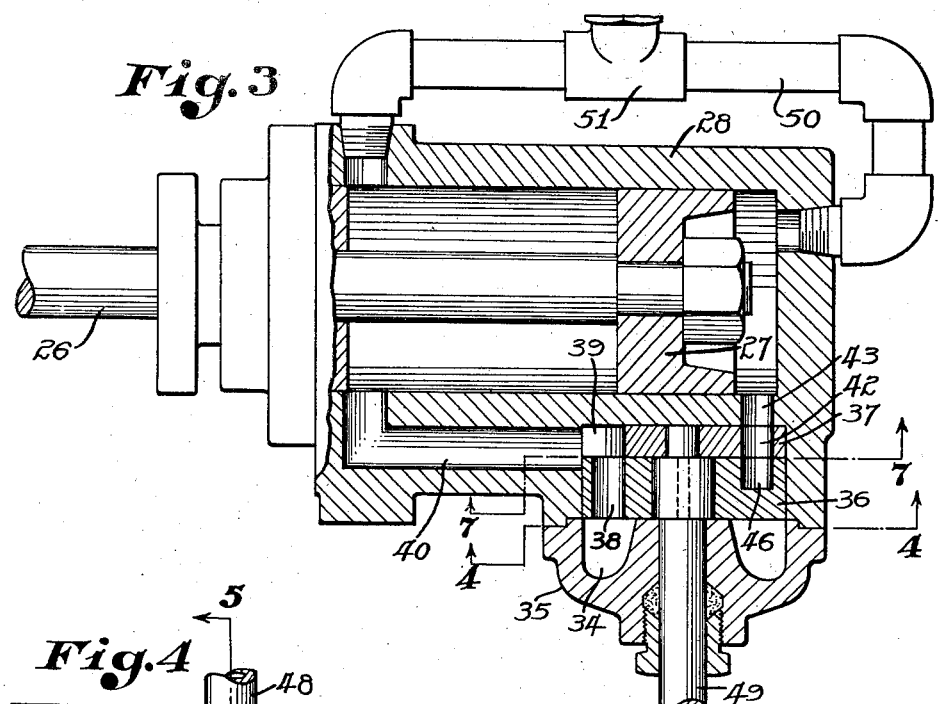
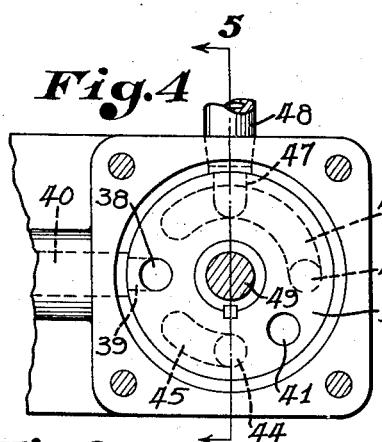
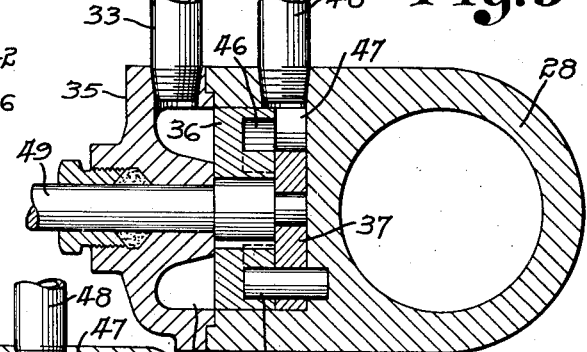
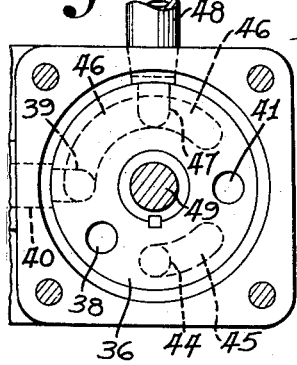
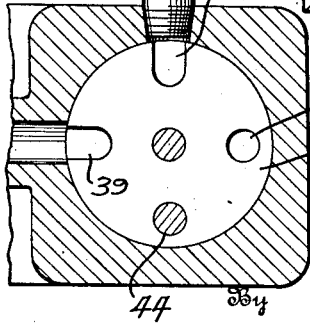
Inventor
Larkin R. Williamson
By Owen & Owen
Attorneys July 26, 1932. L. R. WILLIAMSON 1,869,084
HYDRAULIC CONTROL FOR POWER TRANSMISSION MECHANISM
Filed Oct. 6, 1930 4 Sheets-Sheet 4
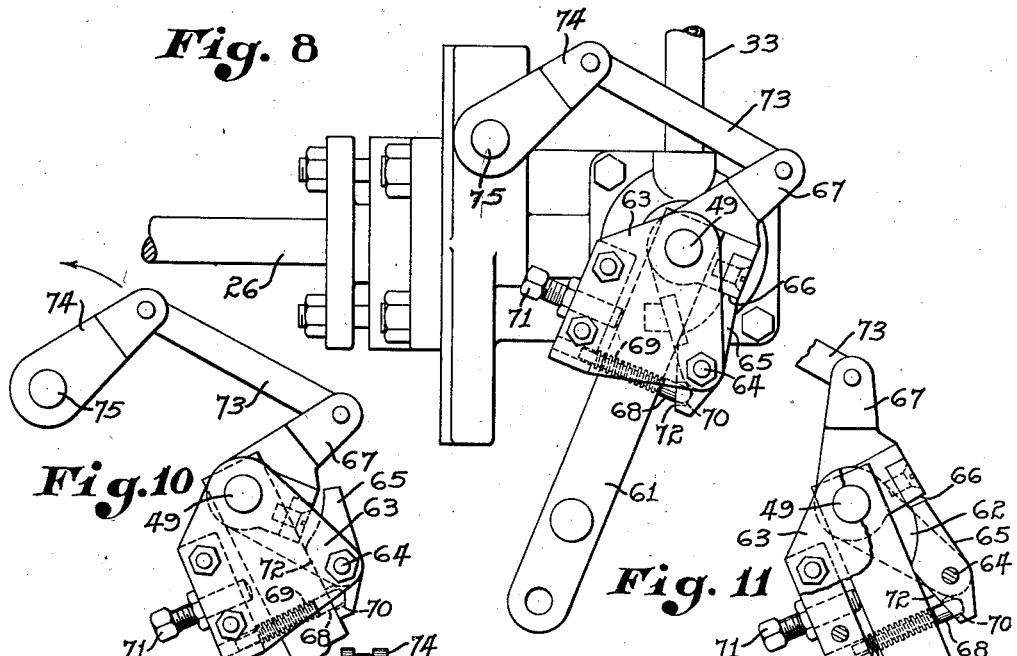
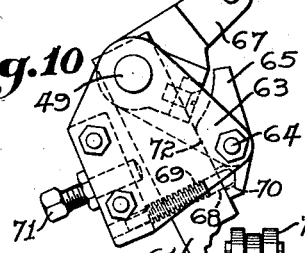
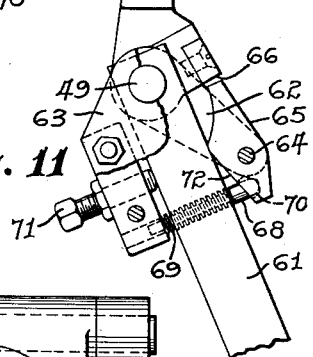
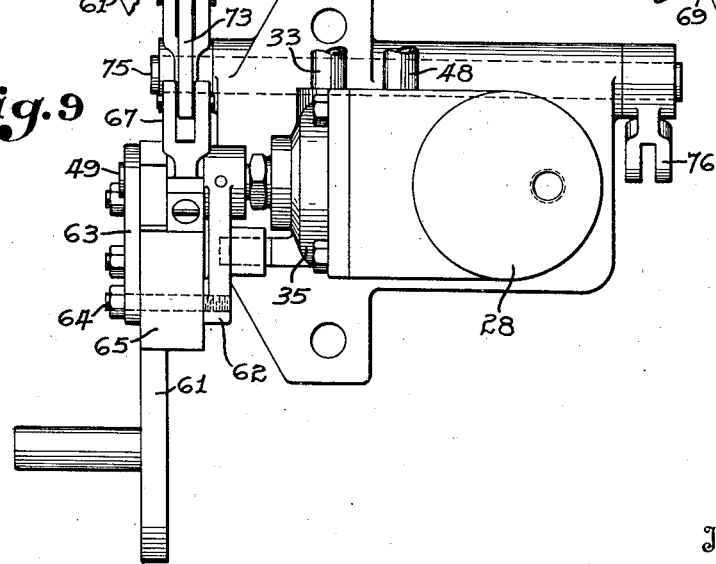
Inventor
Larkin R. Williamson
By Owen & Owen
Attorneys Patented July 26, 1932

1,869,084

UNITED STATES PATENT OFFICE

LARKIN R. WILLIAMSON, OF TOLEDO, OHIO, ASSIGNOR TO THE TOLEDO MACHINE & TOOL COMPANY, OF TOLEDO, OHIO, A CORPORATION OF OHIO

HYDRAULIC CONTROL FOR POWER TRANSMISSION MECHANISM

Application filed October 6, 1930. Serial No. 486,639.

This invention relates to hydraulic control for power transmission mechanism, such as a clutch, which in the present instance connects the operating mechanism of a power press to a source of power.

The object of the invention is to provide control means for the purpose stated, including a shifting member and means for directing fluid pressure against said member to shift the same in either direction. The pressure directing means may be actuated manually or automatically, as desired. The pressure is developed preferably by means of a pump driven by the same source of power as that which operates the mechanism to be controlled.

My invention, in its present embodiment, will be described in detail in connection with the accompanying drawings in which Figure 1 is an end elevation of a power press having the invention associated therewith.

Figure 2 is a front elevation of the same with parts broken away.

Figure 3 is a detailed sectional view taken longitudinally of the cylinder having a fluid operated piston.

Figure 4 is a section taken on the line 4—4 of Figure 3.

Figure 5 is a section taken on the line 5—5 of Figure 4.

Figure 6 is a view similar to Figure 4 but showing the valve in a different position.

Figure 7 is a view taken on the line 7—7 of Figure 3.

Figure 8 is a detailed view of the valve operating mechanism.

Figure 9 is a view taken from the right of Figure 8.

Figures 10 and 11 are views similar to Figure 8 but showing the mechanism in different positions.

Figure 12 is a detailed view of the manually operated emergency stop.

The invention is illustrated in connection with a well known type of power press having a frame 15 and a crank shaft 16 driven by gears 17 and 18 through a friction clutch 19 connected with a drive shaft 20. The clutch 19 is shifted thru the medium of an arm 21 and a bell crank 22 operatively connected therewith. There is also an operative connection between the bell crank 22 and the brake 23, so that when the clutch is disconnected the brake is set and when the clutch is connected the brake is released. The bell crank 22 is operated through the medium of a shaft 24 mounted on the side of the frame 15 and having arms connected respectively with the bell crank 22 and a pitman 25 which is connected to a piston rod 26.

A piston head 27 is secured to the inner end of the piston rod 26 and operates within a cylinder 28. Fluid pressure for operating the piston head 27 is in the present instance supplied by a rotary pump 29 connected by suitable driving means 30 with the drive shaft 20. By means of this pump, fluid is drawn from a suitably located tank 31 through a pipe 32 to the pump and thence discharged through a pipe 33 into an annular chamber 34 formed within a box 35 secured to the side of the cylinder housing 28. From the chamber 34 the fluid is discharged thru a valve 36 and a valve seat 37 into one end or the other of the cylinder, depending upon the position of the valve.

In the positions shown in Figures 3, 4 and 5 the fluid passes from the chamber 34 through a port 38 in the valve, port 39 in the valve seat, and passageway 40 into the lefthand end of the cylinder as viewed in Figure 3. This forces the piston head 27 toward the right, or toward the left as viewed in Figure 1, thus rocking the shaft 24 and bell crank 22 in a direction to release the clutch and set the brake.

If the valve 36 is shifted to the position shown in Figure 6, however, communication between the ports 38 and 39 is cut off and at the same time a port 41 in the valve is brought into registry with a port 42 in the seat 37, so that the fluid is directed through the ports 41 and 42 and through an opening 43 into the other end of the cylinder, thus driving the piston toward the left as viewed in Figure 3 and into position to engage the clutch and release the brake.

While fluid is being forced into the lefthand end of the cylinder as viewed in Figure 10

3, the fluid already in the righthand end of the cylinder is discharged through the opening 43, port 42 and an arcuate channel 46 in the valve and thence returned through a pipe 48 to the tank 31. With the valve in the position shown in Figure 6, as fluid is forced into the cylinder through the opening 43, the fluid in the other end of the cylinder is discharged through the passageway 40, port 39 and channel 46 and is returned through the pipe 48 to the tank 31. Each position of the valve is limited by a dowel pin 44 which is set in the cylinder housing and extends into an arcuate channel 45 in the valve.

The valve 36 is keyed to a shaft 49 which may be rocked by means hereinafter described to shift the valve to the desired position. In order to render the valve ineffective in case of emergency a by-pass 50 is provided to connect opposite ends of the cylinder and in this by-pass is located a valve box 51 in which a valve is operable by an arm 52 to open or close the by-pass. The means connected with the arm 52 for operating the by-pass valve will be later described. It is also advisable to provide a relief valve in the line 33 for relieving the pressure when it becomes too great. Such a relief valve may be located in a box indicated at 53 in Figure 1 and is provided with a return pipe 54 to the tank 31.

Normally the slide comes to rest at the upper end of its stroke. The usual means for initiating the next operation comprises a treadle 55 pivoted at 56 and normally held in raised position by a spring 57. This treadle is connected through a link 58, bell crank 59, and link 60 to the lower end of a lever 61 which is journaled at its upper end on the valve shaft 49. At one side of the lever 61 an arm 62 is secured to the shaft 49 and at the other side of the lever 61 a plate 63 is mounted on the shaft 49 and is connected to the arm 62 by a bolt or pin 64. A pawl 65 pivoted on the pin 64 is adapted, when the parts are in the position shown in Figure 8, to engage a shoulder 66 on an arm 67 which is also journaled on the shaft 49. As the treadle 55 is depressed to start the machine, the lever 61 is swung toward the right from the position shown in Figure 8. A pin 68 is carried by the lever 61 and is yieldably held by a spring 69 in engagement with a recess 70 formed in the rear end of the pawl 65. When the lever 61 is in a position of rest it rests against a stop 71 carried by the plate 63. As the lever 61 is swung toward the right, it trips the pawl 65 out of engagement with the shoulder 66 and the flat side 72 of the pawl is engaged by the edge of the lever as shown in Figure 10. Then the lever 61 acting through the pawl 65, pin 64 and arm 63 rocks the valve shaft 49 while the arm 67 remains stationary. The valve is thus rocked to the position shown in Figure 6, whereby the fluid from the pump is directed through the opening 43 to move the piston in a direction to release the brake and engage the clutch.

During the operation of the press the clutch remains in operative position until the conclusion of the operation and is then automatically disengaged and the brake set through the operation of the piston 27. In order to effect this operation automatically, the arm 67 is connected by a link 73 to an arm 74 secured to one end of a shaft 75. An arm 76 secured to the other end of the shaft 75 is connected through a link 77, bell crank 78 mounted in a bearing 79 at one end of the frame, and a link 80, to a crank disk or eccentric 81 secured to the crank shaft 16. As the slide approaches the lower end of its stroke, therefore, the arm 67 and parts connected therewith are moved from the position shown in Figure 10 to the position shown in Figure 11 and during the upward movement of the slide, the arm 62 as well as the arm 67, is returned to the position shown in Figure 8, thereby rocking the valve shaft 49 and returning the valve to the position shown in Figures 3, 4 and 5. Thus the parts are in position to move the piston 27 and rod 26 toward the righthand end of the cylinder as viewed in Figure 3. This sets the brake and disengages the clutch automatically when the slide is at the upper end of its stroke.

In case of an emergency, the clutch may be immediately disengaged and the brake set by a downward movement of the handle 82, which first opens the by-pass valve in the box 51 through the medium of a link 83 which has a resilient connection 84 with the arm 52. This makes it possible to shift the piston and the clutch regardless of the position of the valve 36. A link 85 is connected with the rear end of the lever 82 and has a pin and slot connection 86 with the link 25. The length of the slot is sufficient to permit normal operation of the control mechanism without disturbing the lever 82 when the latter is in normal position. In an emergency however, after the lever 82 has been depressed far enough to open the by-pass valve, a further depression causes the rear end of the slot 86 to engage the pin and advance the link 25, thereby disengaging the clutch and setting the brake. In order to start again the lever 82 may be raised high enough to release the brake and engage the clutch, at the same time closing the by-pass valve.

From the foregoing description it will be seen that a hydraulic clutch control in accordance with my invention is equally adapted either for manual operation, or for automatic control so that the slide comes to a stop at the end of its upward travel. Provision is made for a continuous flow of fluid under pressure into one end of the cylinder and a return flow from the other end of the cylinder to the tank while the clutch is being shifted, and a relief valve is provided to take care of the pressure while the piston is stationary. The pump driving gear is connected to the operating mechanism of the press, so that there can be no failure of the clutch control while the machine is operating. Provision is also made, in connection with the by-pass around the piston, for positive manual operation of the hydraulic control in case of an emergency.

While I have shown and described specifically the construction and operation of one embodiment of the invention by which the desired objects may be accomplished, it is apparent that the same may be modified to a considerable extent without departing from the scope of the appended claims.

What I claim is:

1. In a power press, the combination with mechanism to be operated, a drive shaft, a clutch for connecting the drive shaft to said mechanism, means operable by fluid pressure for shifting said clutch, manually actuated means for directing the fluid pressure, to connect the clutch, means for automatically reversing the effect of the fluid pressure to disconnect the clutch after a predetermined cycle of operation, and manually operable emergency means for rendering the fluid pressure ineffective and at the same time disconnecting the clutch.

2. In a power press, the combination with mechanism to be driven, of a clutch therefor, means normally controlled by fluid pressure to shift the clutch, manually operable means to render the fluid pressure control ineffective, and means connected to said manually operable means to shift the clutch independently of the fluid pressure.

3. In a power press, the combination with mechanism to be driven, a drive shaft, and a clutch for connecting the drive shaft to said mechanism, of means normally controlled by fluid pressure to shift said clutch, a fluid tank, a pump connected with the tank and driven by said drive shaft to develop said fluid pressure, manually operable means to render the fluid pressure control ineffective, and means connected to said manually operable means to shift the clutch independently of the fluid pressure.

4. In a power press, the combination with a shaft, a brake, and a clutch through which the shaft is driven, of a member operable to connect or disconnect the clutch and simultaneously to release or set the brake, reversible hydraulic means to shift said member in either direction, a single valve controlling said hydraulic means, means manually operable to shift said valve to render said hydraulic means effective to connect the clutch and release the brake, and means automatically operable after a predetermined movement of said shaft to restore said valve to its initial position to render said hydraulic means effective to disconnect the clutch and set the brake.

5. In a power press, the combination with mechanism to be driven, a drive shaft, and a clutch for connecting the drive shaft to said mechanism, of means driven by said shaft to develop fluid pressure, means manually operable for directing said fluid pressure to connect the clutch, means automatically operable after a predetermined operation of said mechanism to render said fluid pressure effective to disconnect the clutch, and means actuated by the manually operable means, as it is moved to connect the clutch, to interrupt the control of said clutch by the automatically operable means.

6. In a power press, the combination with mechanism to be driven, a drive shaft, and a clutch for connecting the drive shaft to said mechanism, of a shift member operable to connect or disconnect said clutch, fluid pressure control means for actuating said shift member in either direction, means operated by said drive shaft to develop said fluid pressure, means manually operable to render said fluid pressure effective to connect the clutch, means automatically operable after a predetermined operation of said mechanism to render said fluid pressure effective to disconnect the clutch, and means actuated by the manually operable means, as it is moved to connect the clutch, to interrupt the control of said clutch by the automatically operable means.

7. In a power press, the combination with a power transmission device, of a member operatively connected with said device and movable to shift the same, a piston connected to said member, a cylinder in which the piston operates, control means for introducing fluid under pressure into either end of the cylinder to shift said member and thereby connect or disconnect the transmission device, means manually operable to render the control means effective to connect the transmission, means automatically operable after a predetermined operation to render said control means effective to disconnect the transmission, and means actuated by the manually operable means, as it is moved to connect the clutch, to interrupt the control of said clutch by the automatically operable means.

8. In a power press, the combination with a power transmission device, of a member operatively connected with said device and movable to shift the same, a piston connected to said member, a cylinder in which the piston operates, a pump to develop fluid pressure, control means for directing said fluid pressure into either end of the cylinder to shift said member and thereby connect or disconnect the transmission device, means manually operable to render the control means effective to connect the transmission device, means automatically operable after a predetermined operation to render the control means effective to disconnect the transmission device, means for driving said pump from the same source of power as said transmission device, and means actuated by the manually operable means, as it is moved to connect the clutch, to interrupt the control of said clutch by the automatically operable means.

9. In a power press, the combination with a clutch and mechanism driven through said clutch including a rotatable member, of a control member operable to connect or disconnect said clutch, hydraulic means for shifting said member, manually actuated means to shift the hydraulic means to connect said clutch for initiation of normal operation of said mechanism, means operable by said rotatable member for automatically shifting the hydraulic means back to its original position to disconnect the clutch and stop the mechanism at a predetermined point in the operation of said mechanism, and means actuated by the manually operable means, as it is moved to connect the clutch, to interrupt the control of said clutch by the automatically operable means.

10. In a power press, the combination with a clutch, of means for shifting said clutch, said means including a piston and a cylinder in which said piston operates, control means for introducing fluid under pressure into either end of the cylinder and simultaneously discharging fluid from the other end thereof, means for automatically reversing said control means at the completion of a predetermined operation, and manually operable emergency means to provide a by-pass between the opposite ends of the cylinder independent of said control means.

11. In a power press, a clutch, mechanism adapted to be driven thereby, a piston having an operative connection to said clutch for shifting the same, a cylinder in which the piston operates, a fluid pressure line connected with the cylinder, a valve in said line, said valve having, in one position, means to direct the fluid pressure into one end of the cylinder and having, in another position, means to direct the fluid pressure into the opposite end of the cylinder, means for automatically shifting said valve from one of said positions to the other after a predetermined operation of said mechanism to terminate said operation, and manually operable means for shifting the valve in the opposite direction to initiate the next operation.

12. In a power press, a clutch, a rotary member adapted to be driven thereby, means operable by fluid pressure to shift the clutch, a valve having a rocking movement to direct the fluid pressure in either direction, a rock shaft to which the valve is secured, means controlled from said rotary member to rock the valve shaft in one direction to disconnect the clutch at the completion of a predetermined operation, and manually operable means to rock the valve shaft in the opposite direction to connect the clutch for another operation and at the same time to release the valve from the means controlled by the rotary member.

13. In a power press, a mechanism including a rotatable member to be driven, a drive member, a clutch for connecting said member and mechanism, reversible fluid operated means for engaging and releasing said clutch, a single valve controlling said means, means operable to move said control to effect an engagement of the clutch, and means automatically operable by said rotatable member at a predetermined point in the movement of said mechanism to move said valve to effect a release of the clutch and stop said mechanism.

14. In a power press, a mechanism including a rotatable member to be driven, a drive member, a clutch for connecting said member and mechanism, reversible fluid actuated means operable to release said clutch, a single valve controlling said means, and means automatically operable by said rotatable member at a predetermined point in the movement of said mechanism to move said valve to effect a release of the clutch and stop said mechanism.

15. In a power press, a mechanism including a rotatable member to be driven, a drive member, a clutch for connecting said member and mechanism, reversible fluid actuated means operable to release said clutch, a single valve controlling said means, means automatically operable by said rotatable member at a predetermined point in the movement of said mechanism to move said valve to effect a release of the clutch and stop said mechanism, and manually operable means to release said clutch.

16. In a power press, a mechanism including a rotatable member to be driven, a drive member, a clutch for connecting said shaft and mechanism, reversible fluid operated means for engaging and releasing said clutch, a single valve controlling said means, means operable by said rotatable member to move said valve to effect an engagement of the clutch, means automatically operable at a predetermined point in the movement of said mechanism to move said valve to effect a release of the clutch to stop said mechanism, and means manually operable at will to release the clutch.

17. In a power press, a mechanism to be driven, a drive member, a clutch for connecting said member and mechanism, fluid actuated means operable to engage and release the clutch, a rotary control for said means, first and second rocker members mounted for rocking movements about a common axis, the first member being connected to the control means whereby the movement of the one imparts movement to the other, a trip connection between said rocker members operable to automatically release the second member when the first member is moved to effect a clutch engaging operation of the fluid operated means, means connecting said second rocker member and driven mechanism to impart predetermined rocking movements to one from operating movements of the other, said second rocker member, at a predetermined point in its movement, being automatically engageable with said trip means to actuate the first rocker member to move the control to clutch releasing position.

In testimony whereof I have hereunto signed my name to this specification.

LARKIN R. WILLIAMSON.